(12) United States Patent
Nishida et al.

(10) Patent No.: US 7,373,529 B2
(45) Date of Patent: May 13, 2008

(54) PERFORMING A POWER SUPPLY CHECK FOR AN INFORMATION STORAGE DEVICE TO INCREASE POWER CONSUMPTION IN A STEPWISE MANNER

(75) Inventors: Masatsugu Nishida, Kawasaki (JP); Masafumi Naitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 11/007,460

(22) Filed: Dec. 8, 2004

(65) Prior Publication Data

US 2005/0102542 A1 May 12, 2005

(30) Foreign Application Priority Data

Jun. 28, 2002 (WO) ............... PCT/JP02/06573

(51) Int. Cl.
*G06F 1/00* (2006.01)
*G06F 1/26* (2006.01)
*G06F 11/30* (2006.01)

(52) U.S. Cl. ............... 713/300; 713/320; 713/340

(58) Field of Classification Search ............... 713/300, 713/320, 321, 340; 360/73.03, 73.02
See application file for complete search history.

(56) References Cited

U.S. PATENT DOCUMENTS

| | | | |
|---|---|---|---|
| 5,691,948 A | 11/1997 | Sakabe | |
| 6,215,609 B1 | 4/2001 | Yamashita et al. | |
| 6,230,277 B1 | 5/2001 | Nakaoka et al. | |
| 6,928,567 B2 * | 8/2005 | Nakai | 713/340 |
| 2001/0000982 A1 * | 5/2001 | Yamashita et al. | 360/73.03 |

FOREIGN PATENT DOCUMENTS

| | | |
|---|---|---|
| EP | 0 522 483 | 1/1993 |
| EP | 0 522 483 A2 | 1/1993 |
| EP | 0 772 191 | 5/1997 |
| JP | 53-138246 | 12/1978 |
| JP | 58-041455 | 3/1983 |
| JP | 62-017842 | 1/1987 |
| JP | 62-155721 | 7/1987 |
| JP | 02-006324 | 1/1990 |
| JP | 02-081392 | 3/1990 |
| JP | 2-118809 | 5/1990 |
| JP | 03-229332 | 10/1991 |
| JP | 08-335357 | 12/1996 |
| JP | 09-128885 | 5/1997 |
| JP | 9-306084 | 11/1997 |
| JP | 10-162483 | 6/1998 |
| JP | 11-053037 | 2/1999 |
| JP | 11-306501 | 11/1999 |

(Continued)

*Primary Examiner*—Suresh K Suryawanshi
(74) *Attorney, Agent, or Firm*—Greer, Burns & Crain, Ltd.

(57) ABSTRACT

In an information storage device adapted to use a power supply supplied from an interface or a battery, a voltage input from the power supply is monitored in each time the power consumption of the device is gradually increased upon connection of the power supply, so that the power consumption or the function of the device is limited based on the result of monitoring. Alternatively, a voltage or a current input from the power supply during operation of the device is monitored, so that the power consumption or the function of the device is limited based on the result of monitoring.

15 Claims, 13 Drawing Sheets

FOREIGN PATENT DOCUMENTS

| | | |
|---|---|---|
| JP | 3069308 | 3/2000 |
| JP | 2000-267681 | 9/2000 |
| JP | 2000-284867 | 10/2000 |
| JP | 2000-353032 | 12/2000 |
| JP | 2001-067156 | 3/2001 |
| JP | 2001-320234 | 11/2001 |
| JP | 2002-117616 | 4/2002 |
| WO | WO 97/41558 | 11/1997 |

* cited by examiner

PERFORMING A POWER SUPPLY CHECK FOR AN INFORMATION STORAGE DEVICE TO INCREASE POWER CONSUMPTION IN A STEPWISE MANNER

TECHNICAL FIELD

The present invention relates to an information storage device adapted to operate by means of power supplied from an interface or a battery, and more particularly, the invention relates to an information storage device capable of continuing to operate while limiting its power consumption in accordance with a power supply voltage or a power supply current.

BACKGROUND ART

In recent years, USB (Universal Serial Bus) interfaces are becoming established as interfaces for PC peripheral equipment due to their good connectivity such as hot plugging capability that allows an external drive to be connected to or disconnected from a personal computer (PC) with power being turned on. USB-compliant peripheral equipment has extended from low and medium speed transmission functions such as mouses, keyboards, printers, scanners, etc., of early days up to middle and high speed transmission functions such as FDD (Floppy Disk Drive), HDD (Hard Disk Drive), MO (Magneto Optical disk), CD-ROM (Compact Disk ROM), AV equipment, etc.

One of the functions of USB or IEEE 1394 is to supply electric power from a PC main body to its peripheral equipment. The peripheral equipment, being compatible with these connection standards or specifications and being bus-powered as well can be supplied with electricity from the PC main body. In other words, a special power supply need not be separately connected to the peripheral equipment itself. A USB connector can be four pins, of which two are used for signal lines for data transmission and the remaining two are used for supplying electric power to the peripheral equipment or USB device.

As the number of pieces of peripheral equipment connected to a PC, there arise various problems such as a shortage of outlets, the inability of use caused by forgetting to turn on power, and so on. In addition, it might happen that a notebook PC, if used outdoors, can itself be powered by a battery but can not actually be used because of non-availability of power to its peripheral equipment. In such cases, however, these problems can be solved if the peripheral equipment is bus-powered. In recent years, bus-powered products are coming to appear even in the fields of information storage devices or information recording and reproducing devices such as FDDs, Super Disk drives, ZIP drives, etc.

According to the USB standard, it is specified that the power supply voltage output from a port of the PC main body should have a voltage of 5 V±5% and a minimum current supply capacity of 500 mA. Accordingly, the specification of peripheral equipment should be in these ranges, and the consumption current of a high-power bus-powered device is specified as a maximum of 500 mA.

However, when an information storage device draws in the current supplied, the power supply voltage supplied to the information storage device drops considerably due to the direct current resistance of its cable and the contact resistance of its connector as compared with the power supply voltage of the USB in the PC main body. Therefore, in the worst case, there arises a problem that a reset circuit in the information storage device might be operated, thus making its recording and/or reproducing operation unstable or incomplete. Also, there might occur another problem that the information storage device is separated or cut off from the PC host at a time. Moreover, there might arise a further problem that the power supply for the information storage device is turned off depending upon the threshold of a regulator IC in the PC main body with an overcurrent protective function.

The present invention is intended to obviate the problems as referred to above, and has for its object to provide an information storage device which can be used in a stable manner in various connection environments, and which can eliminate or avoid resetting during operation.

DISCLOSURE OF THE INVENTION

The present invention resides, in one aspect, in information storage device adapted to use a power supply supplied from an interface or a battery, the device comprising: a first electrical parameter monitoring part that monitors an electrical parameter in respect of the power input from the power supply; a determination part that determines, based on the result of monitoring the electrical parameter by the first electrical parameter monitoring part, whether control is to be performed by limiting the operation or function of the device at the start of supplying power from the power supply; and a first control part that operates the device by limiting the operation or function thereof based on the determination of the determination part. For example, it is characterized in that the first control part limits, based on the monitoring result, the operation or function of the device to an operational or functional range which the capacity of the power supply at the start of supplying power from the power supply is able to permit. According to such a construction, the power supply voltage or the power supply current is monitored during connection of the power supply for the information storage device, so that the device can continue stable operation by limiting the power consumption or function thereof in accordance with the value thus monitored. Accordingly, it is possible to eliminate trouble such as a crash of the information storage device during operation. That is, at the start of operation of the device, a determination is made beforehand as to whether a limited operation of the device is required, and when the limited operation is required, the device is controlled to operate in a limited manner from the beginning. As a result, the device can be operated within a range permitted from the standpoint of electric power after the operation of the device has been ascertained by actually supplying power thereto from the power supply. Thus, it is possible to ensure the excellent operation of the device in terms of stability and reliability.

In addition, the information storage device of the present invention is characterized in that the first electrical parameter monitoring part includes a power consumption increasing part that increases the power consumption of the device in a stepwise manner, and monitors the electrical parameter in each step in which the power consumption is increased stepwise. According to such a construction, by monitoring the information storage device while gradually increasing the power consumption thereof upon connection of the power supply to the device, an amount of actual power consumption can be estimated so that the device can continue stable operation by properly limiting the power consumption or function thereof.

Moreover, the information storage device of the present invention is characterized by comprising: an operation mode setting part that sets a plurality of operation modes corresponding to the magnitude of the electrical parameter in a selectable manner; wherein the first control part selects one operation mode from the plurality of operation modes set by the operation mode setting part based on the monitoring result of the first electrical parameter monitoring part. For example, the operation mode can include at least one of a read-only operation mode, a normal operation mode, and a bias first application inhibition operation mode. With such a construction, too, the device can continue stable operation by controlling the device to operate in a mode corresponding to the state of the power supply. Here, the electrical parameter can be a voltage value or a current value. These electrical parameters are indispensable for the stable operation of the device, and can be easily monitored.

In another aspect, the present invention resides in an information storage device adapted to use a power supply supplied from an interface or a battery, the device comprising: a second electrical parameter monitoring part that monitors an electrical parameter in respect of the power input from the power supply during operation in which power is being supplied; and a second control part that limits the operation or function of the device to an operational or functional range which the power supply is able to permit, by reducing the power consumption of the device based on the result of monitoring the electrical parameter by the second electrical parameter monitoring part. According to such a construction, the power supply voltage is monitored during the operation of the information storage device, so that the power consumption of the device can be suppressed or the function thereof can be limited in accordance with the value of the power supply voltage or the power supply current, whereby the device can continue stable operation, thus making it possible to eliminate trouble such as a crash of the information storage device during operation.

Preferably, in the information storage device of the present invention, it is characterized in that the second control part limits the number of revolutions per minute of a spindle motor. In addition, it is characterized in that the second control part limits an access time. Moreover, it is characterized in that the second control part limits the frequency of a system clock. Further, the information storage device of the present invention is characterized in that in the case of an actuator being driven by using PWM, the second control part limits the duty ratio of the PWM. According to such a construction, it is possible to limit the power consumption of the device in an appropriate manner with a little influence on the operation thereof.

Preferably, the information storage device of the present invention is characterized in that the monitoring result of the second electrical parameter monitoring part is the result of monitoring a change in the magnitude of the electrical parameter over a predetermined period of time. According to such a construction, even when an alarm is generated during other processing, it is possible to limit the power consumption or function of the device.

Preferably, the information storage device of the present invention is characterized in that the second electrical parameter monitoring part performs monitoring by providing hysteresis to the electrical parameter. According to such a construction, a stable determination can be made even with a varying voltage or current.

Preferably, the information storage device of the present invention is characterized in that when the electrical parameter falls below a predetermined value, the second electrical parameter monitoring part generates an alarm, which is held until an interrupt becomes possible. According to such a construction, even if the value of the voltage or the current falls during the execution of processing of an arithmetic unit, it is possible to properly deal with such a situation.

Preferably, the information storage device of the present invention is characterized in that when the alarm is generated in a load sequence, the second control part limits the function of the device thereafter only to reading information. In addition, it is characterized in that the second control part limits the power consumption of the device when the alarm is generated during a command standby or command execution time. Moreover, it is characterized in that the second control part limits the power consumption of the device in case where the alarm is generated during a command standby or command execution time, and is not released even if a predetermined period of time has elapsed. According to such a construction, it is possible to prevent the power consumption from being limited more than necessary.

The above and other objects, features and advantages of the present invention will become more readily apparent to those skilled in the art from the following detailed description of preferred embodiments of the present invention taken in conjunction with the accompanying drawings While the invention has been described in terms of preferred embodiments, those skilled in the art will recognize that the invention can be practiced with modifications within the spirit and scope of the appended claims.

BEST MODE FOR CARRYING OUT THE INVENTION

Hereinafter, preferred embodiments of the present invention will be described in detail while referring to the accompanying drawings. In the embodiments of the present invention, description will be made to an example of an information recording and reproducing device which receives electric power supplied from a USB connector, and an MO is taken as an example of an information recording medium.

Embodiment 1

In this embodiment, upon connection of an information recording and reproducing device, the voltage of a power supply is read while increasing a load current in its operating state, so that the power consumption and the operation mode thereof are switched in accordance with the result thus read. Here, note that the switching of the power consumption is to limit the power consumption of the information recording and reproducing device from its normal operating state into its power saving state, and in addition, the switching of the operation mode is to limit the function of the information recording and reproducing device.

Figure 1:
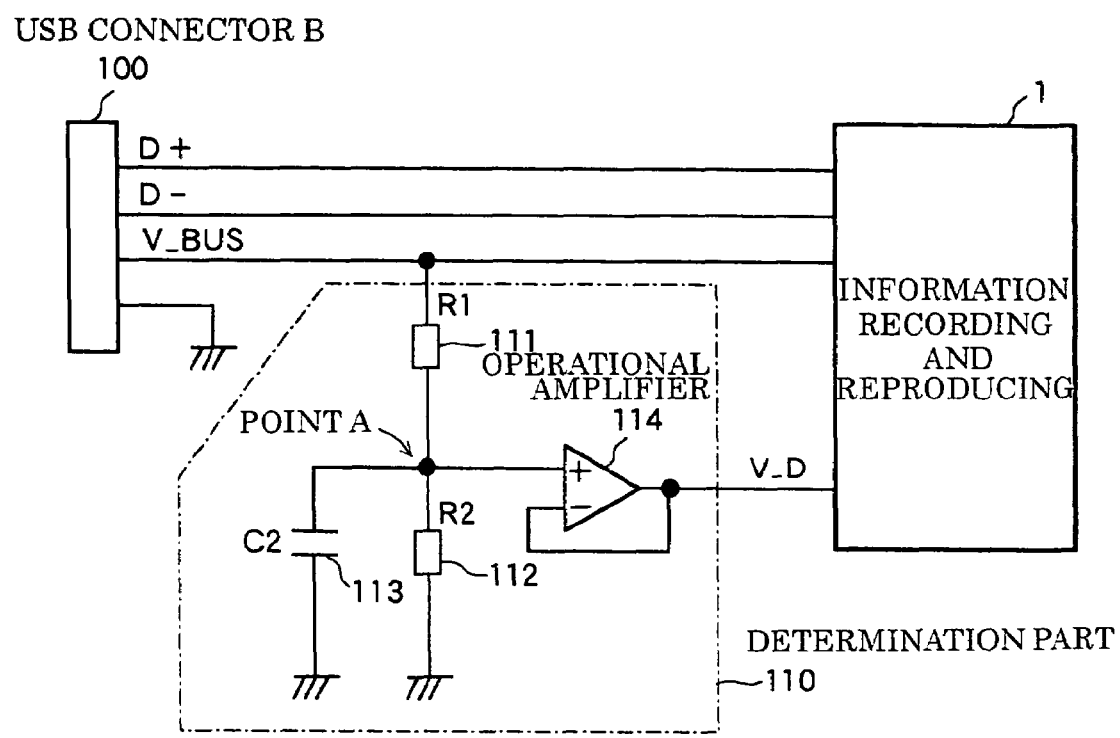
FIG. 1 is a block diagram showing one example of the construction of an information recording and reproducing device according to a first embodiment of the present invention.

FIG. 1 is a block diagram illustrating one example of the construction of an information recording and reproducing device according to a first embodiment of the present invention. As shown in FIG. 1, this information recording and reproducing device comprises a USB connector B 100, a determination part 110 and an information recording and reproducing part 1. The determination part 110 includes a resistor 111 with a resistance value of R1, a resistor 112 with a resistance value of R2, a capacitor 113 with a capacitance value of C2, and an operational amplifier 114.

Figure 2:
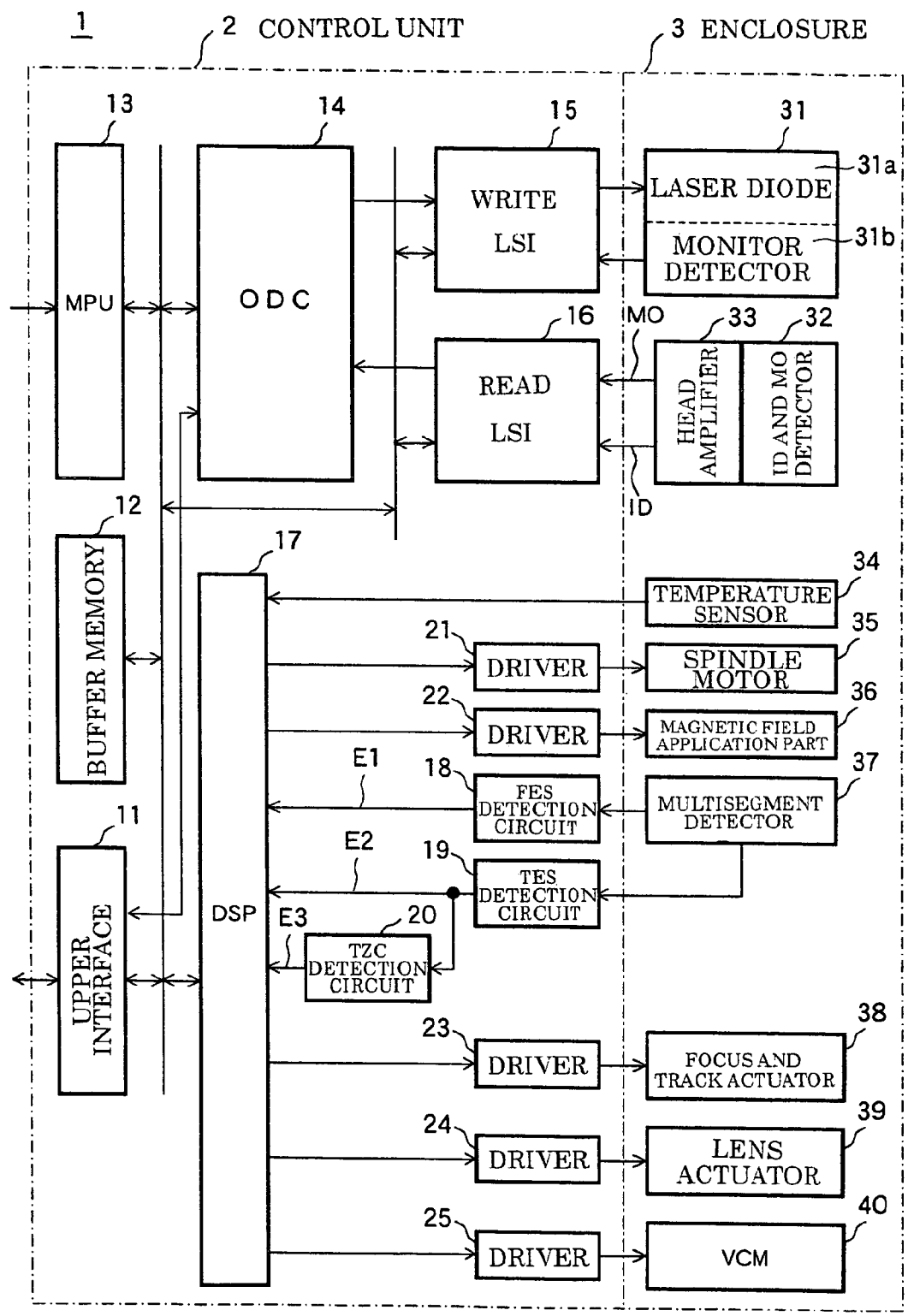
FIG. 2 is a block diagram showing one example of the construction of an information recording and reproducing part.

Now, the construction of the information recording and reproducing part 1 will be described. FIG. 2 is a block diagram that illustrates one example of the construction of the information recording and reproducing part. As shown in FIG. 2, this information recording and reproducing part 1 includes a control unit 2 and an enclosure 3.

The control unit 2 includes an upper interface 11, a buffer memory 12, an MPU (microprocessor unit) 13, a ODC (optical disc controller) 14, a write LSI 15, a read LSI 16, a DSP (digital signal processor) 17, and an FES (focus error signal) detection circuit 18, a TES (tracking error signal) detection circuit 19, a TZC (track zero crossing signal) detection circuit 20, and drivers 21-25. Here, note that the upper interface 11, the buffer memory 12, the MPU 13, the ODC 14, the write LSI 15, the read LSI 16 and the DSP 17 are connected with one another through a bus. The MPU 13, the ODC 14 and the DSP 17 together constitute a control part of this device.

In addition, the enclosure 3 includes a laser diode unit 31, an ID and MO detector 32, a head amplifier 33, a temperature sensor 34, a spindle motor 35, and a magnetic field application part 36, a multisegment detector 37, a focus and track actuator 38, a lens actuator 39, and a VCM (voice coil motor) 40. The laser diode unit 31 has a laser diode 31a and a monitor detector 31b built therein.

Next, the operation of the information recording and reproducing part 1 will be described. The upper interface 11 exchanges commands and data with an upper device connected thereto, and the buffer memory 12 is shared by the upper interface 11, the MPU 13 and the ODC 14, and it is used as a working storage or memory area. The MPU 13 performs the overall control of the information recording and reproducing part 1, and switches the power consumption and the operation mode based on an output of the determination part 110. The ODC 14 performs necessary processing to read and write data with respect to an optical disc medium.

The write LSI 15 incorporates therein a write modulation circuit and a laser diode control circuit, and serves to convert writing data from the ODC 14 into PPM (Pulse Phase Modulation) recorded data or PWM (Pulse Width Modulation) recorded data in accordance with the type of the recording medium thereby to supply the thus converted data to the laser diode unit 31. The laser diode 31a emits light based on the data from the write LSI 15, and the monitor detector 31b detects the amount of light emitted from the laser diode 31a and supplies the result to the write LSI 15.

The signal detected by the ID and MO detector 32 is amplified by the head amplifier 33, and output to the read LSI 16. The read LSI 16 has a read demodulator circuit and a frequency synthesizer built therein, creates a read clock and read data from the output (MO, ID) of the head amplifier 33, and demodulates the data into the original data.

The FES detection circuit 18 detects a focus error signal (E1) based on a detection signal from the multisegment detector 37. The TES detection circuit 19 detects a tracking error signal (E2) based on the detection signal of the multisegment detector 37. The TZC detection circuit 20 detects a track zero crossing signal (E3) based on the tracking error signal of TES detection circuit 19. The DSP 17 performs a variety of kinds of servo control based on the focus error signal, the tracking error signal, the track zero crossing signal, and a temperature detection signal from the temperature sensor 34.

The driver 21 drives the spindle motor 35 in accordance with a drive signal from the DSP 17, and the driver 22 drives the magnetic field application part 36 in accordance with a magnetic field generation signal from the DSP 17. The magnetic field application part 36 is comprised of an electromagnet, and is constructed so as to change the magnetic field applied to the MO recording medium in accordance with a drive signal from the driver 22. Here, note that the magnetic field application part 36 may be of a floating type in which it floats above the recording medium under the action of a magnetic head formed of a magnetic pole and a coil wound therearound, or of a contact type in which it is in contact with the recording medium. The driver 23 drives the focus and track actuator 38 in accordance with a focus control signal from the DSP 17. The driver 24 drives the lens actuator 39 in accordance with a tracking control signal from the DSP 17. The driver 25 drives the VCM 40 in accordance with a VCM control signal from the DSP 17. The above discussion describes the operation of the information recording and reproducing part 1.

Figure 3:
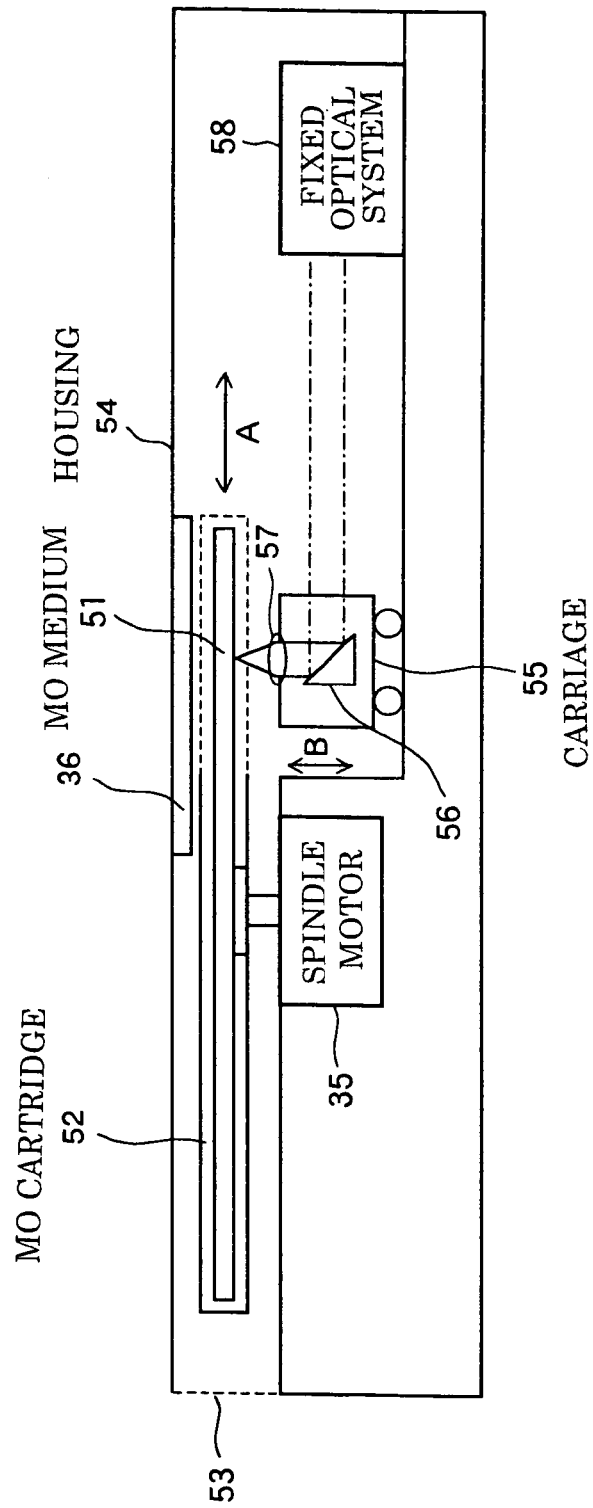
FIG. 3 is a block diagram showing one example of the schematic internal construction of an enclosure.

The schematic internal construction of the enclosure 3 will next be described. FIG. 3 is a block diagram that illustrates one example of the schematic internal construction of the enclosure. As shown in FIG. 3, this enclosure 3 comprises the spindle motor 35, the magnetic field application part 36, an MO medium 51, an MO cartridge 52, an insertion opening 53, a housing 54, a carriage 55, a prism 56, an object lens 57, and a fixed optical system 58.

The operation inside the enclosure 3 will next be described. The MO cartridge 52 receiving therein the MO medium 51 is fitted into the housing 54 from the insertion opening 53, and the MO medium 51 is coupled to the spindle motor 35. Inside the housing 54, a shutter of the MO cartridge 52 is opened so that the MO medium 51 is exposed from the MO cartridge 52, and held between the carriage 55 and the magnetic field application part 36 in the housing 54.

The carriage 55 is arranged so as to be movable in a radial direction (direction of arrow A) of the MO medium 51 by means of the VCM 40. The prism 56 and the object lens 57 are installed onto the carriage 55 in a manner such that the prism 56 refracts a laser beam from the fixed optical system 58 in a direction to the MO medium 51, and the object lens 57 converges the laser beam from the prism 56 onto the MO medium 51. The object lens 57 is caused to swing in a direction of arrow B by means of the focus and track actuator 38 mounted on the carriage 55, as well as in the direction of arrow A by means of the lens actuator 39 mounted on the carriage 55. Focus control is carried out by the swinging motion of the object lens 57 in the direction of arrow B caused by the focus actuator 38, and tracking control is also carried out by the swinging motion of the object lens 57 in the direction of arrow B caused by the lens actuator 39.

Here, it is to be noted that although in the example shown in FIG. 2, tracking is controlled by the VCM 40 and the lens actuator 39, tracking control can be performed only by the use of the VCM 40 without having the cooperation of the lens actuator 39. The above is the operation inside the enclosure 3.

The operation of the information recording and reproducing device shown in FIG. 1 will now be described. First of all, data is transmitted from a D+ line and a D− line among four pins of the USB connector B 100 to the information recording and reproducing part 1, and a V_BUS (+5V) is supplied from a V_BUS line in the form of a power supply for the information recording and reproducing device among the four pins of the USB connector B 100 to the information recording and reproducing part 1 and the determination part 110. In addition, the remaining one pin among the four pins of the USB connector B 100 is connected to ground.

The V_BUS is supplied to each block in the information recording and reproducing part 1, which is connected to ground, and the data is input to the upper interface 11 of the information recording and reproducing part 1.

On the other hand, in the determination part 110 the V_BUS is voltage divided by the resistor 111 and the resistor 112, and a resultant voltage VA obtained at point A is input to the operational amplifier 114. The voltage VA at point A can be represented by VA=R2/(R1+R2)·V_BUS. The capacitor 113 serves to remove a high-frequency component in a variation of the V_BUS so as to prevent an overdetection of the operational amplifier 114. The operational amplifier 114 amplifies the voltage at point A and outputs the result to the information recording and reproducing part 1 of as a V_D.

The V_D is input to an ADC (analog to digital converter) in the MPU 13, which can read the actual voltage of the V_BUS based on the value of the ADC and switch the power consumption and the operation mode in accordance with the value of the V_BUS thus read.

Figure 4:
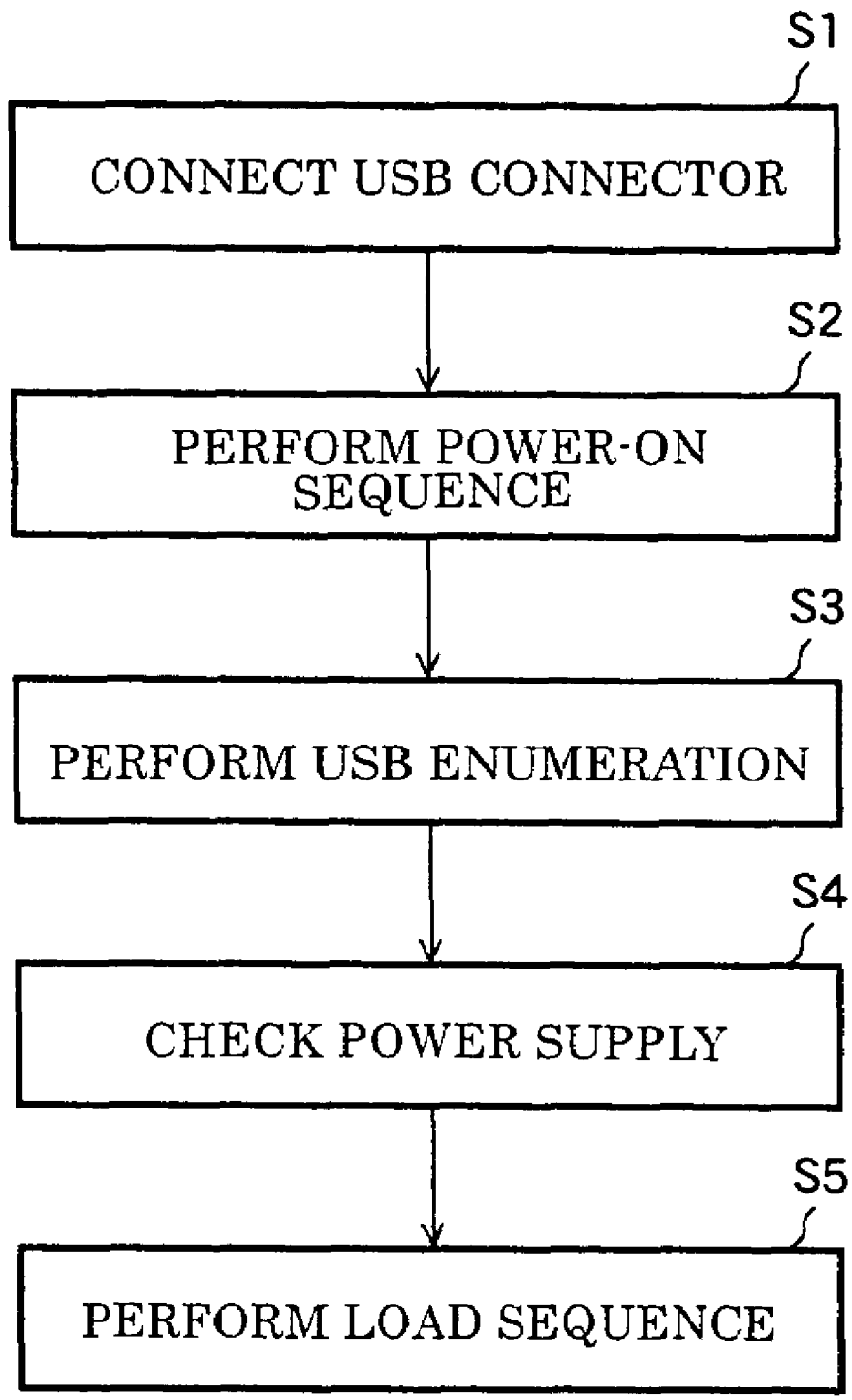
FIG. 4 is a view showing one example of processing at the time of connection of the information recording and reproducing device.

Here, reference will be made to the processing of the information recording and reproducing device when connected while using FIG. 4. First of all, by connecting the USB connector of the information recording and reproducing device to a PC, electric power is supplied to the information recording and reproducing device (S1). Then, the hardware is initialized and the memory is diagnosed according to a power-on sequence (S2), and USB enumeration is carried out so as to enable the information recording and reproducing device to make use of a maximum of 500 mA (S3).

Subsequently, a power supply check is performed (S4), and a load sequence is carried out (S5).

Now, reference will be made to the processing of the power supply check while using a flow chart of FIG. 5. Note that in FIG. 5 to be described below, M represents the state of power consumption, and herein, M=0 represents a value of power consumption under a normal state in which the device is operating at a maximum power; M=1 represents a value of power consumption under a power saving state in which the current supplied to the magnetic field application part 36, the electric power for servo operation or the like is limited; and M=2 represents a load error.

First of all, the MPU 13 determines whether the V_BUS exceeds a predetermined threshold potential V_TH (S11), and when the V_BUS exceeds V_TH (S11, Yes), the MPU 13 controls such that M becomes 0 (S12).

Then, the MPU 13 determines whether M is equal to 2 (S13), and when M is not equal to 2 (S13, No), the MPU 13 controls to make all the LSIs into enable states, sets the clock to the highest frequency (S14), and determines whether the V_BUS exceeds V_TH (S15).

When the V_BUS exceeds V_TH in the state of processing in step S15 (S15, Yes), the MPU 13 supplies a certain predetermined amount of current (1) to the focus and track actuator 38 and the like (S16), and determines whether the V_BUS exceeds V_TH (S17).

When the V_BUS exceeds V_TH in the state of processing in step S17 (S17, Yes), the MPU 13 supplies an amount of current (2) larger than the amount of current (1) to the focus and track actuator 38 and the like (S18), and determines whether the V_BUS exceeds V_TH (S19).

When the V_BUS exceeds V_TH in the state of processing in step S19 (S19, Yes), the MPU 13 supplies the predetermined amount of current (1) to the focus and track actuator 38 and the like, also supplies a current the magnetic field application part 36 so as to generate a magnetic field required for erasure and writing (S20), and determines whether the V_BUS exceeds V_TH (S21).

When the V_BUS exceeds V_TH in the state of processing in step S21, (S21, Yes), the MPU 13 supplies the amount of current (2) to the focus and track actuator 38 and the like, also supplies a current to the magnetic field application part 36 so as to generate a magnetic field required for erasure and writing (S22), and determines whether the V_BUS exceeds V_TH (S23).

When the V_BUS exceeds V_TH in the state of processing in step S23 (S23, Yes), the MPU 13 switches the entire function of the information recording and reproducing device to a normal operation mode (S24), and this control flow is ended in an abnormal termination, whereas when the V_BUS is below V_TH (S23, No), the MPU 13 inhibits supplying the current to the magnetic field application part at the same time as a seek operation, and switches the operation mode of the device into a bias first application inhibition operation mode in which current is supplied to the magnetic field application part after the seek operation has been completed (S28), and this control flow is ended.

On the other hand, when the V_BUS is lower than V_TH in the state of processing in step S11, the MPU 13 switches the operation mode of the device into a load error during a load sequence after a medium has been inserted (S29), and then this control flow is ended.

On the other hand, when the V_BUS is below V_TH in each state of processing in steps S15, S17 and S19, the MPU 13 adds 1 to M and shifts the control flow to processing in step S13 (S25). That is, the power consumption is switched from the normal state into the power saving state, and determines again in the processing of steps S15, S17, S19 and S21 whether the V_BUS exceeds V_TH. In addition, when the V_BUS is below V_TH in the state of processing in step S21, the MPU 13 determines whether M is equal to 1, (S26, No), and if M is not equal to 1 (S26), 1 is added to M (S25) and the control flow shifts to the processing in step S13.

On the other hand, when V_BUS is below V_TH in each state of processing in steps S15, S17 and S19 after the power consumption has been switched into the power saving state, the MPU 13 adds 1 to M (S25) and shifts to the processing of step S13. That is, in the processing of step S13, M becomes equal to 2 (S13, Yes), and the MPU 13 switches the operation mode of the device into a load error in a load sequence after insertion of the medium (S29), and this control flow is ended. Moreover, when the V_BUS is below V_TH in the processing of step S21 after switching of the power consumption into the power saving state, the MPU 13 determines whether M is equal to 1 (S26), and it is determined that M is equal to 1 (S26, Yes), so the MPU 13 switches the operation mode into a read-only operation mode that inhibits the erasure and writing of information data in the information recording and reproducing device and limits its function only to the writing of information data (S27), and this control flow is ended. Here, it is to be noted that in the case of the read-only operation mode, even if a write command is received from a host PC for example, an error may be returned to the host PC, and an indication "ERROR DUE TO POWER SHORTAGE" can be made on a display.

Figure 5:
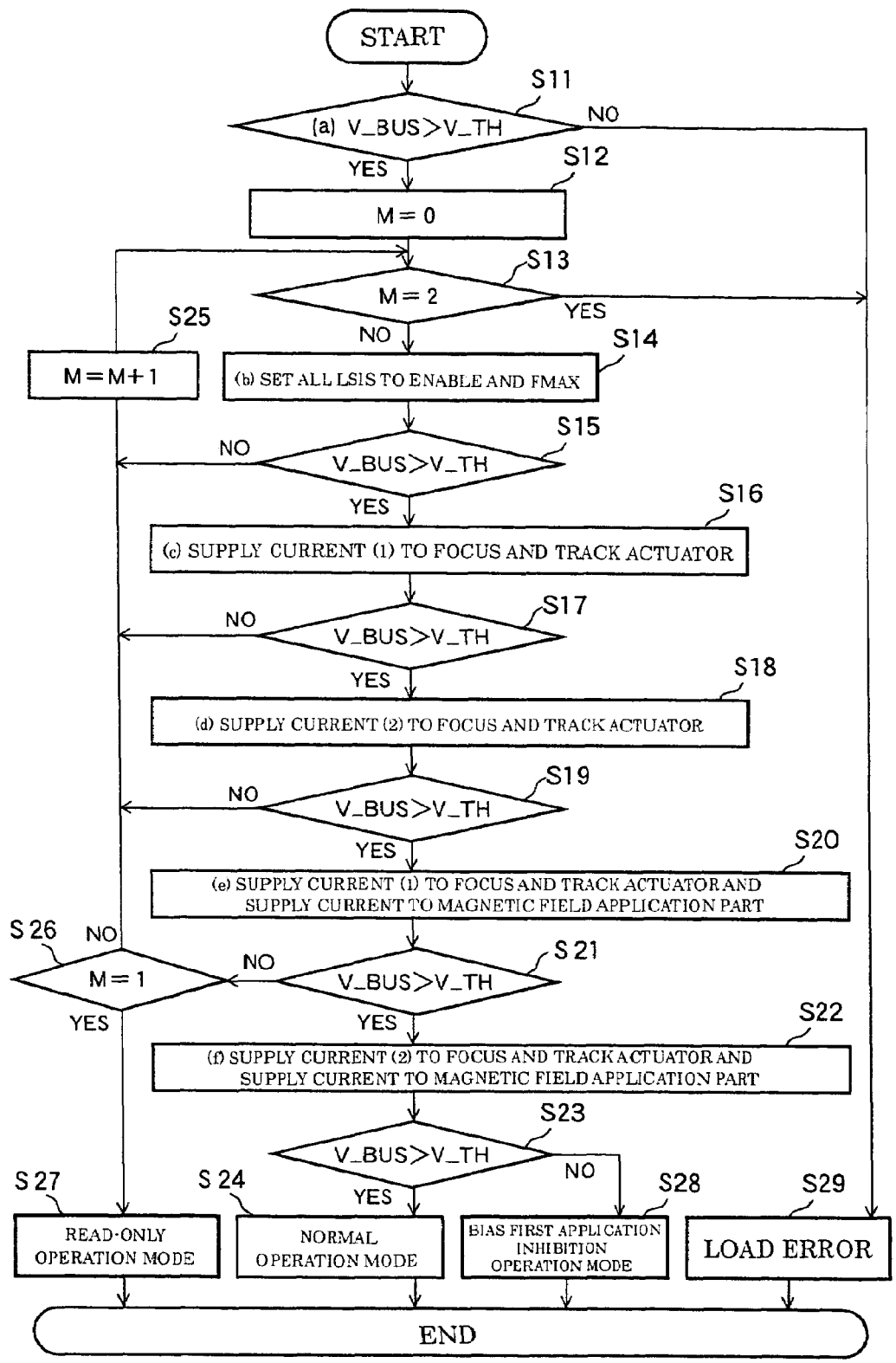
FIG. 5 is a flow chart showing one example of power supply check processing.
Figure 6:
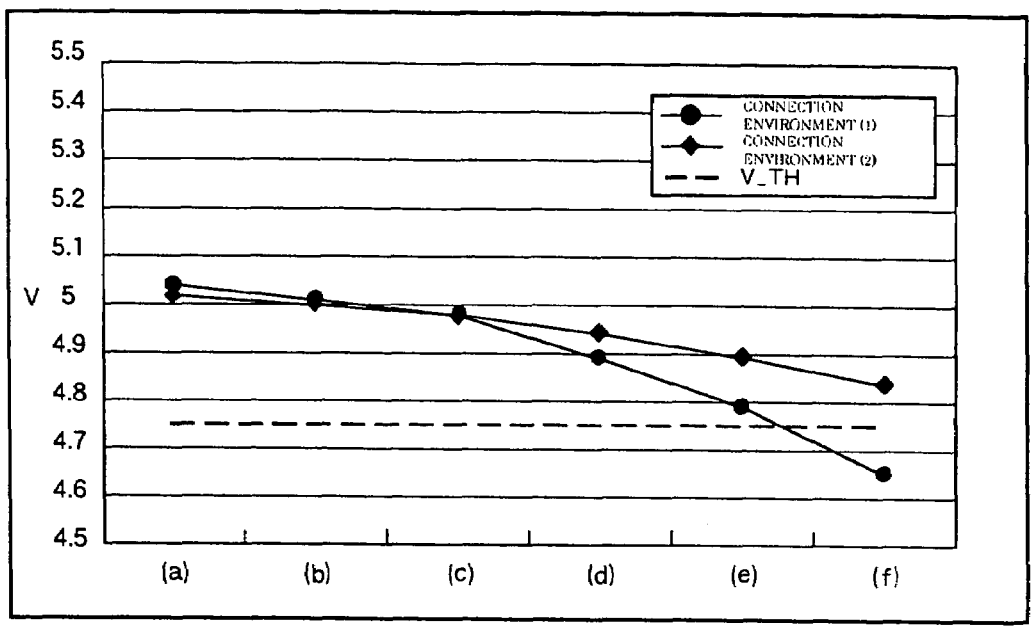
FIG. 6 is a graphical representation of one example of the result of a power supply check.

FIG. 6 illustrates a graphical example of the result of a power supply check. The axis of ordinate represents the V_BUS, and the axis of abscissa represents each of states (a)-(f) in FIG. 5. Since the V_BUS is below V_TH in the state (f) under a first connection environment (1), the MPU 13 controls the information recording and reproducing part 1 so as to make it operate in the bias first application inhibition operation mode. On the other hand, the V_BUS exceeds V_TH in the respective states under a second connection environment (2), so the MPU 13 controls the information recording and reproducing part 1 so as to make it operate in the normal operation mode.

As stated above, in this embodiment, the MPU 13 reads the V_BUS in each state while increasing the load current, and switches the power consumption and the operation mode in accordance with the result of the comparison between the V_BUS and V_TH. In addition, the MPU 13 controls the information recording and reproducing part 1 so as to make it operate with an amount of power consumption and in the operation mode thus switched.

Embodiment 2

This embodiment illustrates another example of the determination part which, upon connection of an information recording and reproducing device, the voltage of a power supply is read while increasing a load current in its operating state, so that the power consumption and the operation mode thereof are switched in accordance with the result thus read, as in the case the first embodiment.

Figure 7:
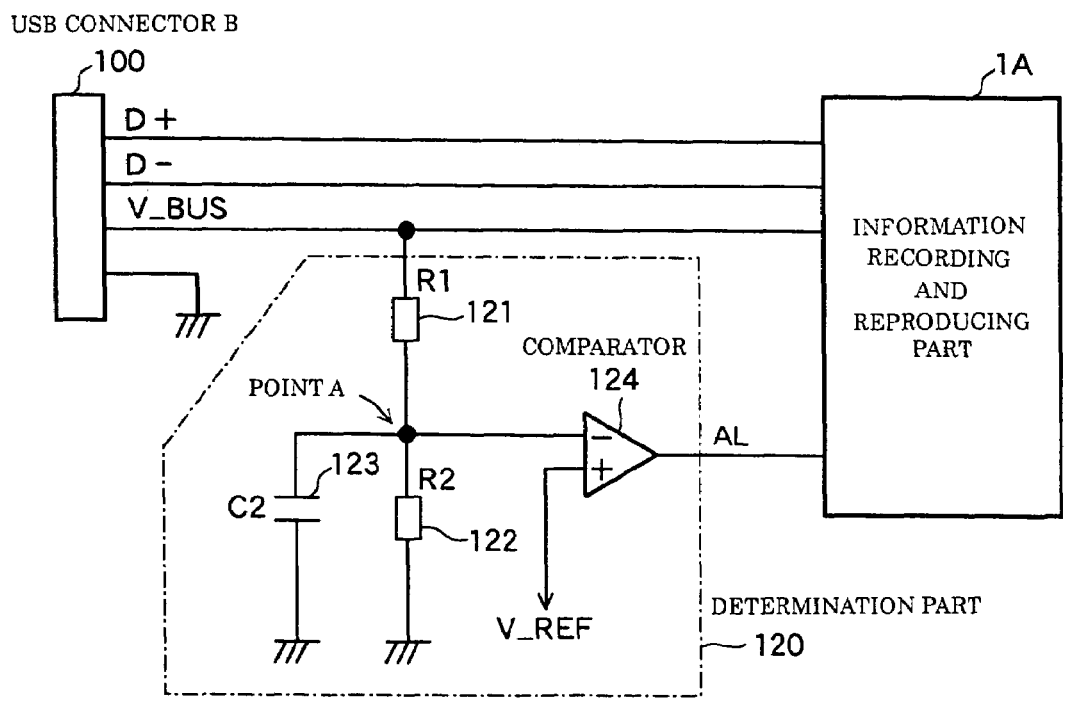
FIG. 7 is a block diagram showing one example of the construction of an information recording and reproducing device according to a second embodiment of the present invention.

FIG. 7 is a block diagram illustrating one example of the construction of the information recording and reproducing device according to the second embodiment of the present invention. As shown in FIG. 7, this information recording and reproducing device comprises a USB connector B 100, a determination part 120 and an information recording and reproducing part 1A. The determination part 120 includes a resistor 121 with a resistance value of R1, a resistor 122 with a resistance value of R2, a capacitor 123 with a capacitance value of C2, and a comparator 124. The information recording and reproducing part 1A is of a construction similar to that of the information recording and reproducing part 1, but with a different input to an MPU 13. Here, note that in FIG. 7, the same symbols as those in FIG. 1 designate the same or corresponding parts shown in FIG. 1, and an explanation thereof is omitted here.

First of all, in the determination part 120, a reference voltage V_REF is generated from a V_BUS by using an unillustrated regulator IC or the like. The reference voltage V_REF thus generated is input to a non-inverting terminal of the comparator 124. Also, the V_BUS is voltage divided by the resistor 121 and the resistor 122 as in the first embodiment, and a resultant voltage VA at point A thus obtained is input to an inverting terminal of the comparator 124. The capacitor 123 serves to remove a high-frequency component in a variation of the V_BUS so as to prevent an overdetection of the comparator 124. The comparator 124 makes a comparison between VA and V_REF, and outputs 0, if VA>V_REF, and 1, if VA<V_REF, to the information recording and reproducing part 1A as an ALARM (alarm: AL). The ALARM (AL) is input to the MPU 13 of the information recording and reproducing part 1A.

In this embodiment, the MPU 13 makes a comparison between the V_BUS and V_TH in FIG. 5 by the use of the ALARM, and as shown in FIG. 5, the ALARM in each state is read while increasing the load current, whereby the power supply state is ascertained so as to switch the power consumption and the operation mode in accordance with the power supply state, as in the first embodiment. In addition, the MPU 13 controls the information recording and reproducing part 1 so as to make it operate with an amount of power consumption and in the operation mode thus switched.

Embodiment 3

Figure 8:
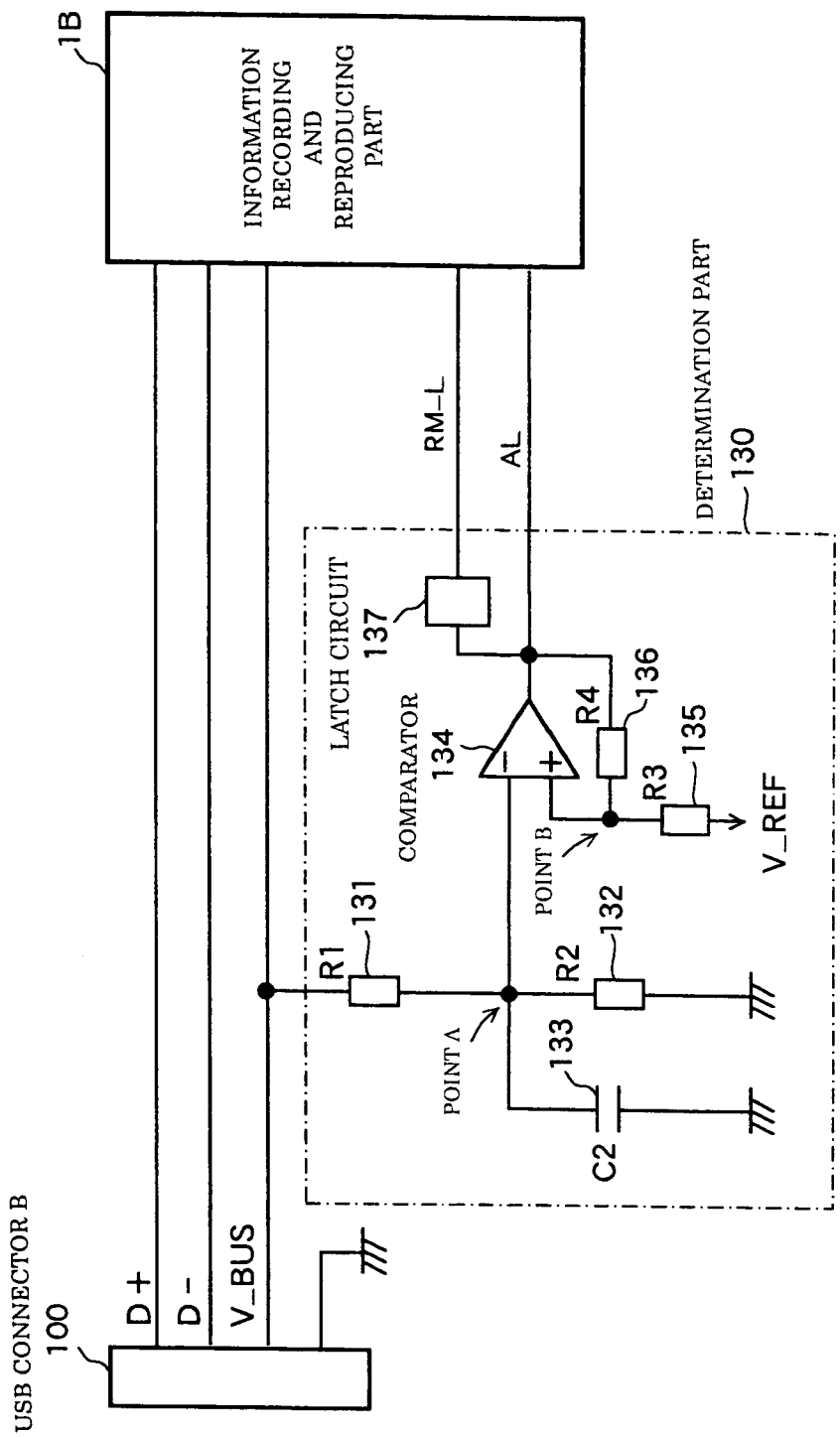
FIG. 8 is a block diagram showing one example of the construction of an information recording and reproducing device according to a third embodiment of the present invention.

In this embodiment, the voltage of a power supply is monitored during operation of an information recording and reproducing device, so that the power consumption and the operation mode are switched in accordance with the result thus monitored. FIG. 8 is a block diagram illustrating one example of the construction of an information recording and reproducing device according to a third embodiment of the present invention. As shown in FIG. 8, this information recording and reproducing device comprises a USB connector B 100, a determination part 130 and an information recording and reproducing part 1B. The determination part 130 includes a resistor 131 with a resistance value of R1, a resistor 132 with a resistance value of R2, a capacitor 133 with a capacitance value of C2, a comparator 134, a resistor 135 with a resistance value of R3, a resistor 136 with a resistance value of R4, and a latch circuit 137. The information recording and reproducing part 1B is of a construction similar to that of the information recording and reproducing part 1, but with a different input to an MPU 13. Note that in FIG. 8, the same symbols as those in FIG. 1 designate the same or corresponding parts shown in FIG. 1, and an explanation thereof is omitted here.

First of all, in the determination part 130, a reference voltage V_REF is generated from a V_BUS, as in the second embodiment. A portion between the reference voltage V_REF thus generated and an output of the comparator 134 is voltage divided by the resistor 135 and the resistor 136, and a resultant voltage VB at point B thus obtained is input to a non-inverting terminal of the comparator 134. Also, similar to the first embodiment, the V_BUS is voltage divided by the resistor 131 and the resistor 132, and a resultant voltage VA at point A thus obtained is input to the comparator 134. The capacitor 133 serves to remove a high-frequency component in a variation of the V_BUS so as to prevent an overdetection of the comparator 134. The comparator 134 makes a comparison between VA and VB, and outputs 0, if VA>VB, and 1, if VA<VB, to the information recording and reproducing part 1B and the latch circuit 137 as an ALARM (AL). According to the determination part 130 as described above, VB becomes low if ALARM=0, and VB becomes high if ALARM=1. As a result, the ALARM in the form of the output of the comparator 134 has hysteresis with respect to the VA in the form of the input thereof.

Here, the MPU 13 does not accept an interrupt due to an ALARM in the load sequence for example, so the latch circuit 137 serves to hold an ALARM that has been generated during the time when the MPU 13 does not accept any interrupt, and output the ALARM thus held to the MPU 13 as an ALARM_LATCH (AL-L) as necessary.

The ALARM thus output is input to an interrupt port of the MPU 13. When the potential of the V_BUS is sufficiently high, VA becomes greater than VB (VA>VB), and the ALARM becomes zero (ALARM=0). At this time, the MPU 13 controls the power consumption in the normal state, but when the potential of the V_BUS falls depending upon the condition of the PC main body, a variation in the environmental condition, etc., the potential of VA also falls, resulting in VA<VB and ALARM=1. After the load sequence, the MPU 13 checks the value of the ALARM_LATCH (AL-L) and switches the operation mode in accordance with the value thus checked.

Figure 9:
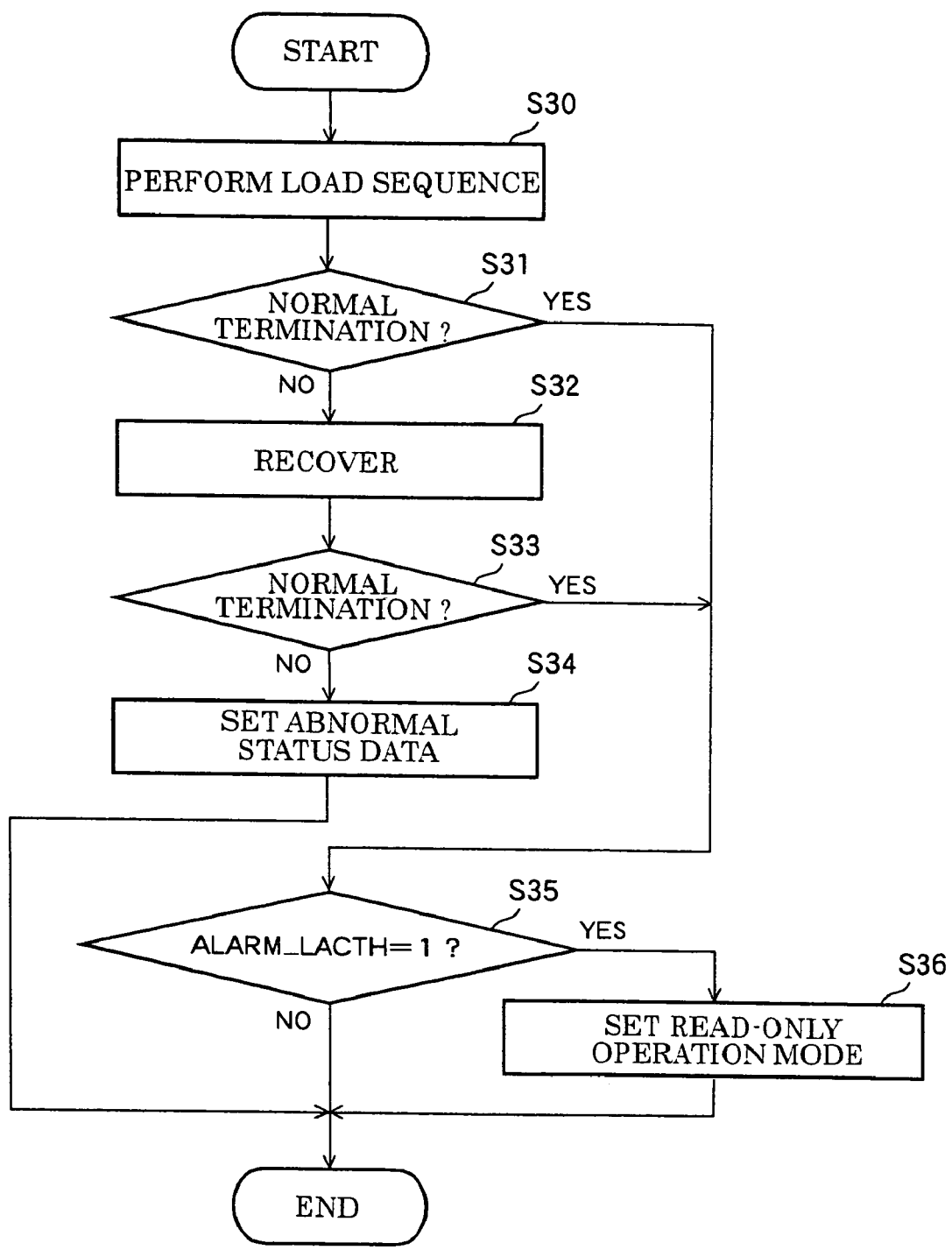
FIG. 9 is a flow chart showing one example of processing for a load sequence.

Hereinafter, reference will be made to the processing of the load sequence while using a flow chart of FIG. 9. First, the MPU 13 executes a load sequence (S30), and determines whether the load sequence has been normally performed (S31). At this time, by looking at the status of the load sequence, the MPU 13 makes a determination, if the status of the load sequence is a good status, that the load sequence has been normally terminated. When the load sequence has been normally terminated in this manner (S31, Yes), the MPU 13 determines whether ALARM_LATCH is equal to 1 (ALARM_LATCH=1)(S35). When ALARM_LATCH=0 (S35, No), this control flow is ended, whereas when ALARM_LATCH=1 (S35, Yes), a read-only operation mode is set (S36), and this control flow is ended.

On the other hand, when the load sequence has not been normally terminated (S31, No), the load sequence is again executed (S32), and the MPU 13 makes a determination as to whether the load sequence has been normally terminated (S33). When the load sequence has been normally terminated at this time (S33, Yes), the control flow shifts to the processing of step S35, whereas when the load sequence has not been normally terminated (S33, No), the MPU 13 sets malfunction or abnormal status data (S34), and this control flow is ended.

Next, reference will be made to the command standby or waiting processing and the command execution processing while using a flow chart of FIG. 10. First of all, the MPU 13 is standby or waiting for a command (S41), and upon receipt of a command (S42), makes a determination as to whether the command thus received is a valid command (S43). When the received command is an invalid command (S43, No), the MPU 13 sends a status indicative of the invalid command (S45), and waits again for another command (S46), whereas when the received command is a valid command (S43, Yes), the MPU 13 executes the command (S44), sends a status indicative of the completion of the command (S45), and waits again for a new command. Here, note that the MPU 13 is in an idle state in the processing of step S41 and in the processing of step S46, and the MPU 13 is in an access state in the processing of steps S42 through step S45.

First, reference will be made to the processing in which an ALARM is generated in the processing of step S44 during the command execution in FIG. 10, while referring to a flow chart of FIG. 11. First of all, in the command execution processing, the MPU 13 determines whether ALARM_LATCH is equal to 1 (i.e., ALARM_LATCH=1)(S51). When ALARM_LATCH=0 (S51, No), the control flow shifts to the processing of step S52, whereas when ALARM_LATCH=1 (S51, Yes), the power consumption is switched according to the flow of FIG. 12 to be described later, and at the same time, the ALARM_LATCH is cleared (S57), after which the counter is set to zero (S52) and a command is executed (S53). After the execution of the command, the MPU 13 makes a determination as to whether the counter exceeds a specified value N (S54), and when the counter exceeds the specified value N (S54, Yes), abnormal status data is set (S62) and this control flow is ended.

On the other hand, when the counter does not exceed the specified value N (S54, No), it is determined whether an ALARM has been generated (S55). When an ALARM has been generated (S55, Yes), the MPU 13 turns off the current to the magnetic field application part 36 at once, also turns off the servo such as the focus and track actuator 38 and the like, decreases the amount of light emitted by the laser diode 31a to an amount of light corresponding to the read power, interrupts the command execution processing (S60), adds 1 to the counter (S61), and returns to the processing of step S53.

On the other hand, when no ALARM has been generated (S55, No), it is determined whether the execution of the command has been normally terminated (S56). When the command execution has not been normally terminated (S56, No), 1 is added to the counter (S61), and a return to the processing of step S53 is carried out, whereas when the command execution has been normally terminated (S56, Yes), this control flow is ended.

Next, reference will be made to the consumption power switching processing which is executed when an ALARM is generated during the command standby time of FIG. 10 or when the ALARM_LATCH is equal to 1 in the command execution processing of step S51 in FIG. 11, while using a flow chart of FIG. 12. First of all, when an ALARM is generated during the command standby or waiting time, the MPU 13 turns off the current to the magnetic field application part 36, also turns off the servo such as the focus and track actuator 38 and the like, decreases the amount of light emission of the laser diode 31a to an amount of light corresponding to the read power (S71), and also lowers the system clock of each macro built into the MPU 13 (S72).

Thereafter, the MPU 13 first adjusts the counter to 0 (S73), then decreases the number of revolutions per minute of the spindle motor 35 (S74), and determines whether the number of revolutions per minute of the spindle motor 35 has become a predetermined number of revolutions per minute (S75). When the predetermined number of revolutions per minute (S75, No) has not been reached, the MPU 13 adds 1 to the counter (S76), and determines whether counter exceeds a specified value N (S77). When the counter does not exceed the specified value N (S77, No), a return to the processing of step S74 is carried out, whereas when the counter exceeds the specified value N (S77, Yes), malfunction or abnormal status data is set (S88), and this control flow is ended.

On the other hand, when the number of revolutions per minute of the spindle motor 35 has become the predetermined number of revolutions per minute (S75, Yes), the MPU 13 first adjusts the counter to 0 (S78), then turns off the servo (S79), and determines whether the servo has become an on state (S80). When the servo has not become an on state (S80, No), the MPU 13 adds 1 to the counter (S81), and determines whether the counter exceeds the specified value N (S82). When the counter does not exceed the specified value N (S82, No), the control flow returns to the processing of step S79, whereas when the counter exceeds the specified value N (S82, Yes), malfunction or abnormal status data is set (S88), and this control flow is ended.

On the other hand, when the servo has become an on state (S80, Yes), the MPU 13 first adjusts the counter to 0 (S83), then reads ID (S84), and determines whether ID has been able to be read (S85). When ID has been able to be read (S85, Yes), this control flow is ended, whereas when ID has not been able to be read (S85, No), the MPU 13 adds 1 to the counter (S86), and determines whether the counter exceeds the specified value N (S87). When the counter does not exceed the specified value N (S87, No), a return to the processing of step S84 is carried out, whereas when the counter exceeds the specified value N (S87, Yes), malfunction or abnormal status data is set (S88), and this control flow is ended.

Figure 12:
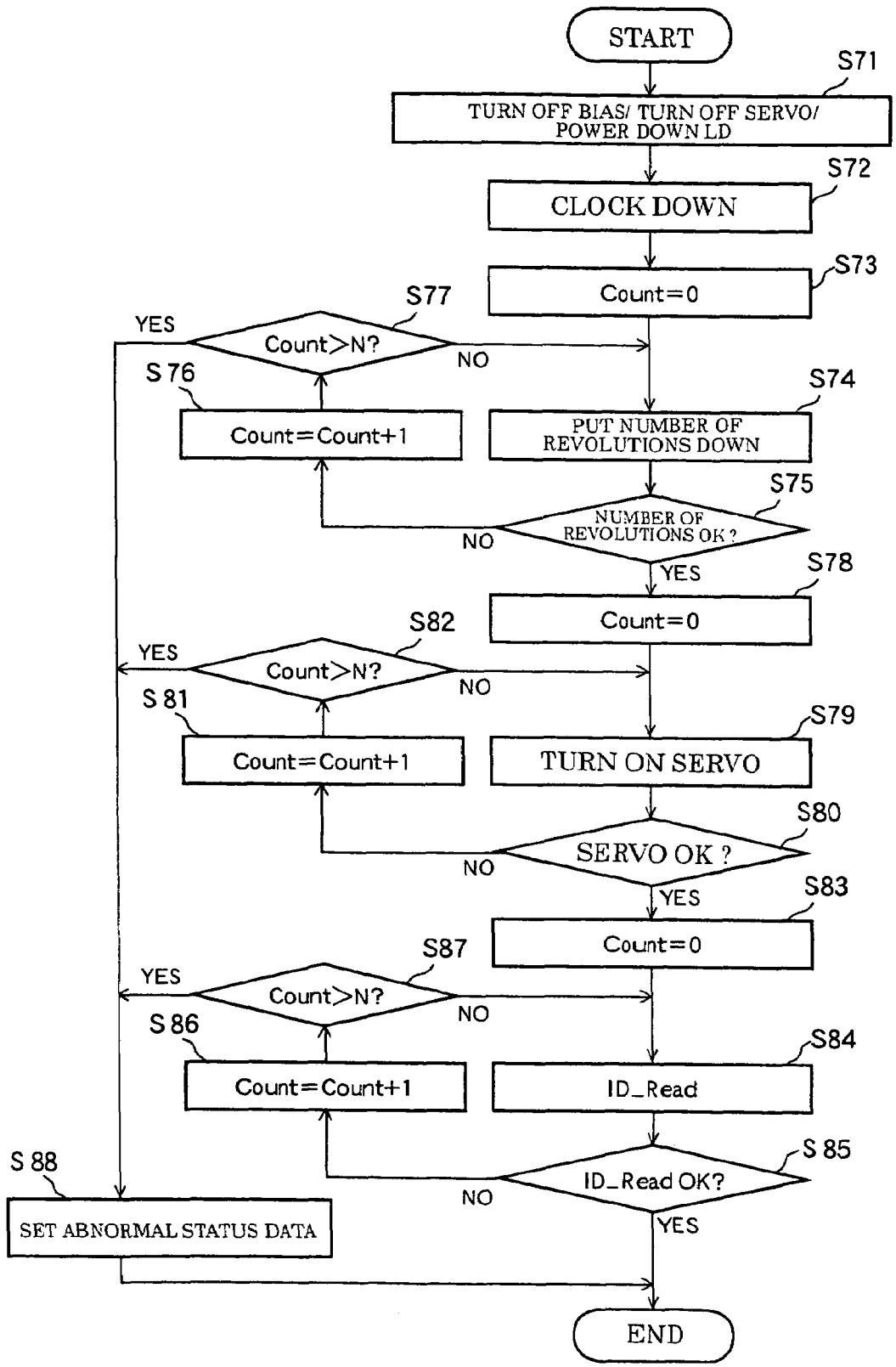
FIG. 12 is a flow chart showing one example of power consumption switching processing.

In this regard, it is to be noted that as a method for limiting the consumption power, the following methods can be adopted other than the above-mentioned control flow shown in FIG. 12. That is, an operation mode is provided in which an access time is decreased by limiting an acceleration current supplied to the focus and track actuator 38 or stopping the current supplied to the magnetic field application part 36 during seek operation, and the operation of the device can be switched into this operation mode. In addition, for example, in an information recording and reproducing device that drives an actuator by PWM drive, the power consumption can be limited by switching an upper limit of the PWM duty ratio.

In this embodiment, the MPU 13 monitors the power supply voltage during operation, and switches the power consumption and the operation mode in accordance with the result of monitoring. Further, the MPU 13 controls the information recording and reproducing part 1 so as to make it operate with an amount of power consumption and in the operation mode thus switched.

Embodiment 4

Figure 10:
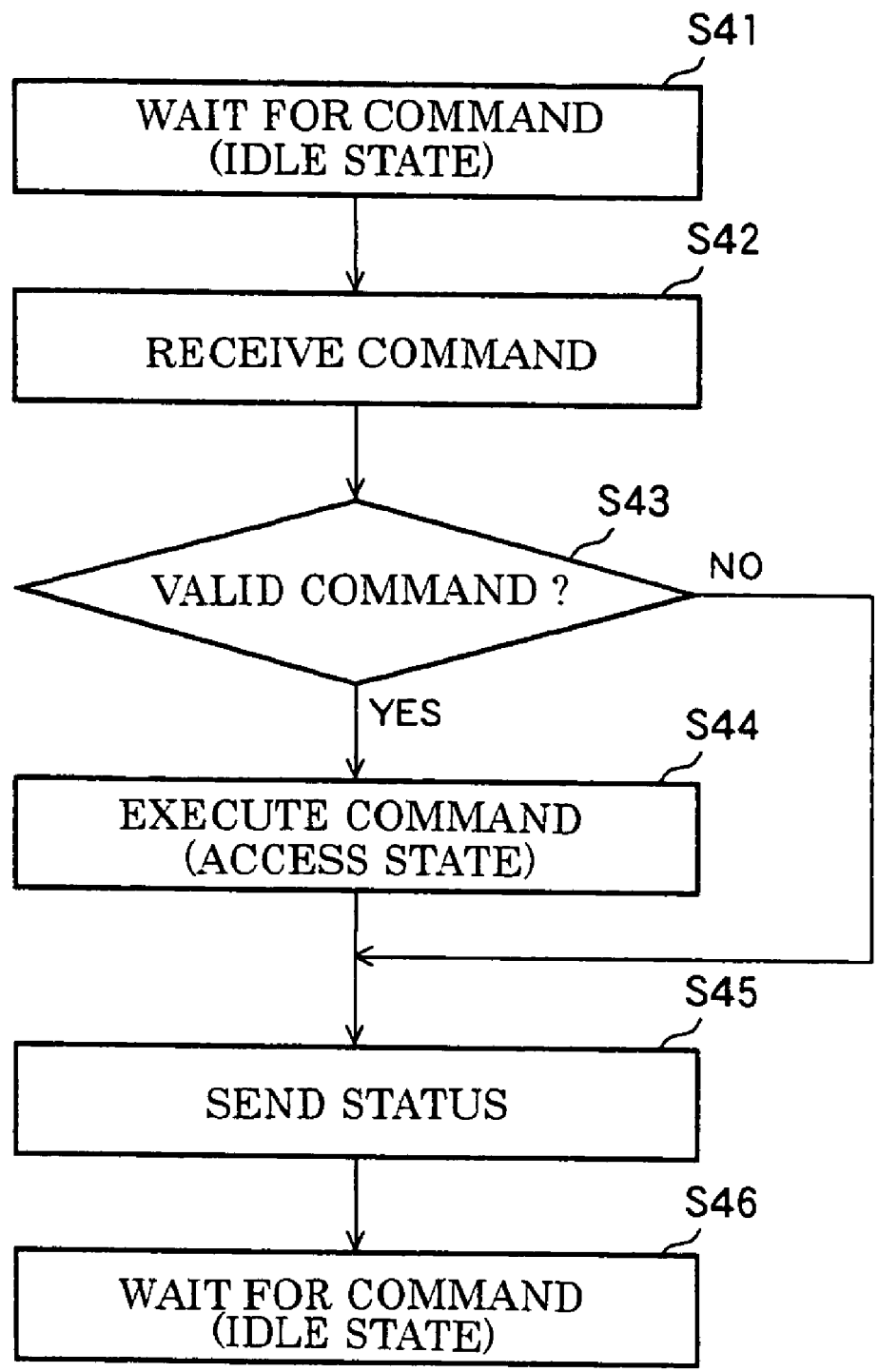
FIG. 10 is a flow chart showing one example of command standby and command execution processing.
Figure 11:
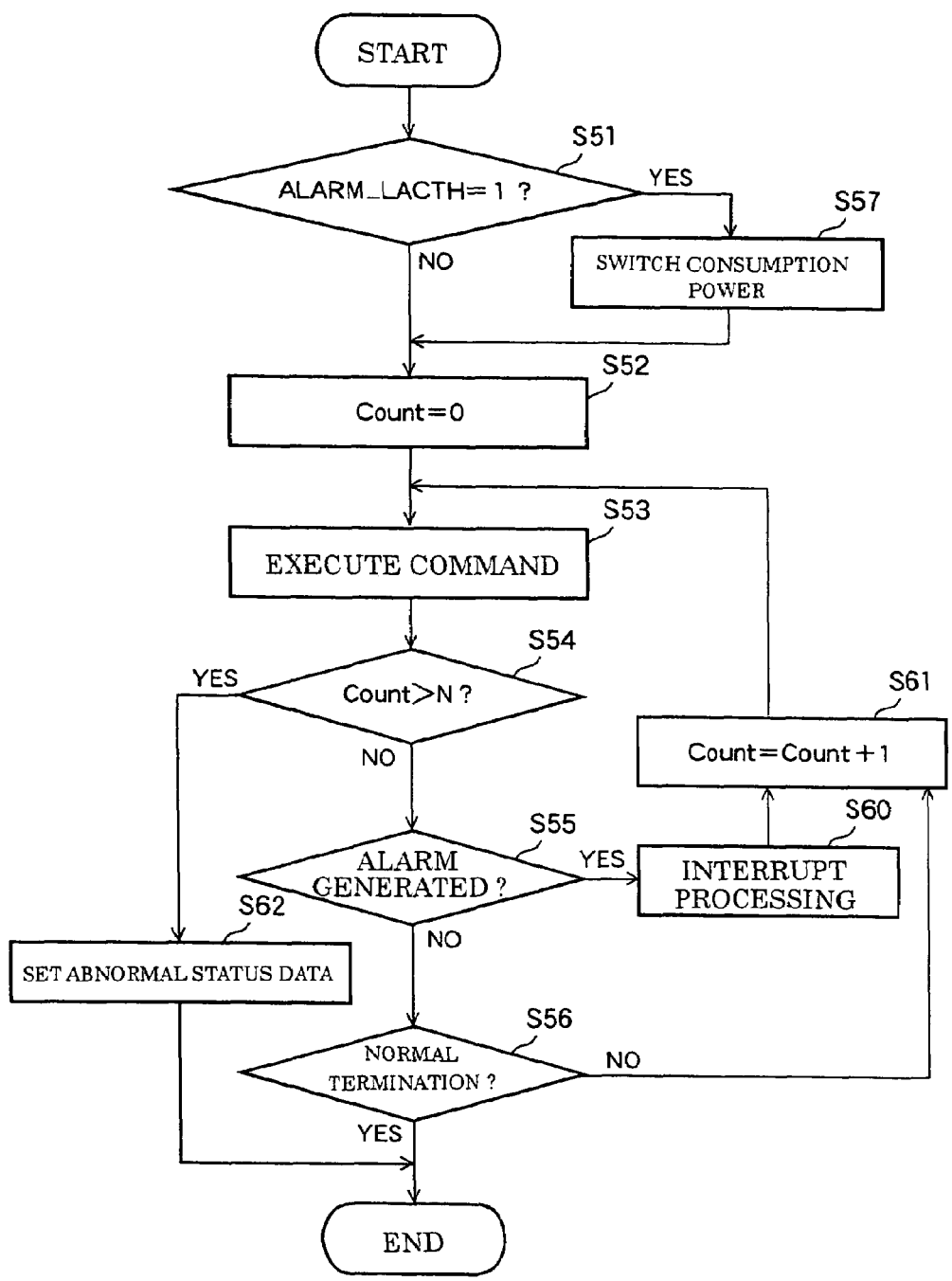
FIG. 11 is a flow chart showing one example of the command execution processing.

This embodiment illustrates another example of the processing executed in case where an ALARM is generated in the processing of step S44 during the command execution in FIG. 10.

Figure 13:
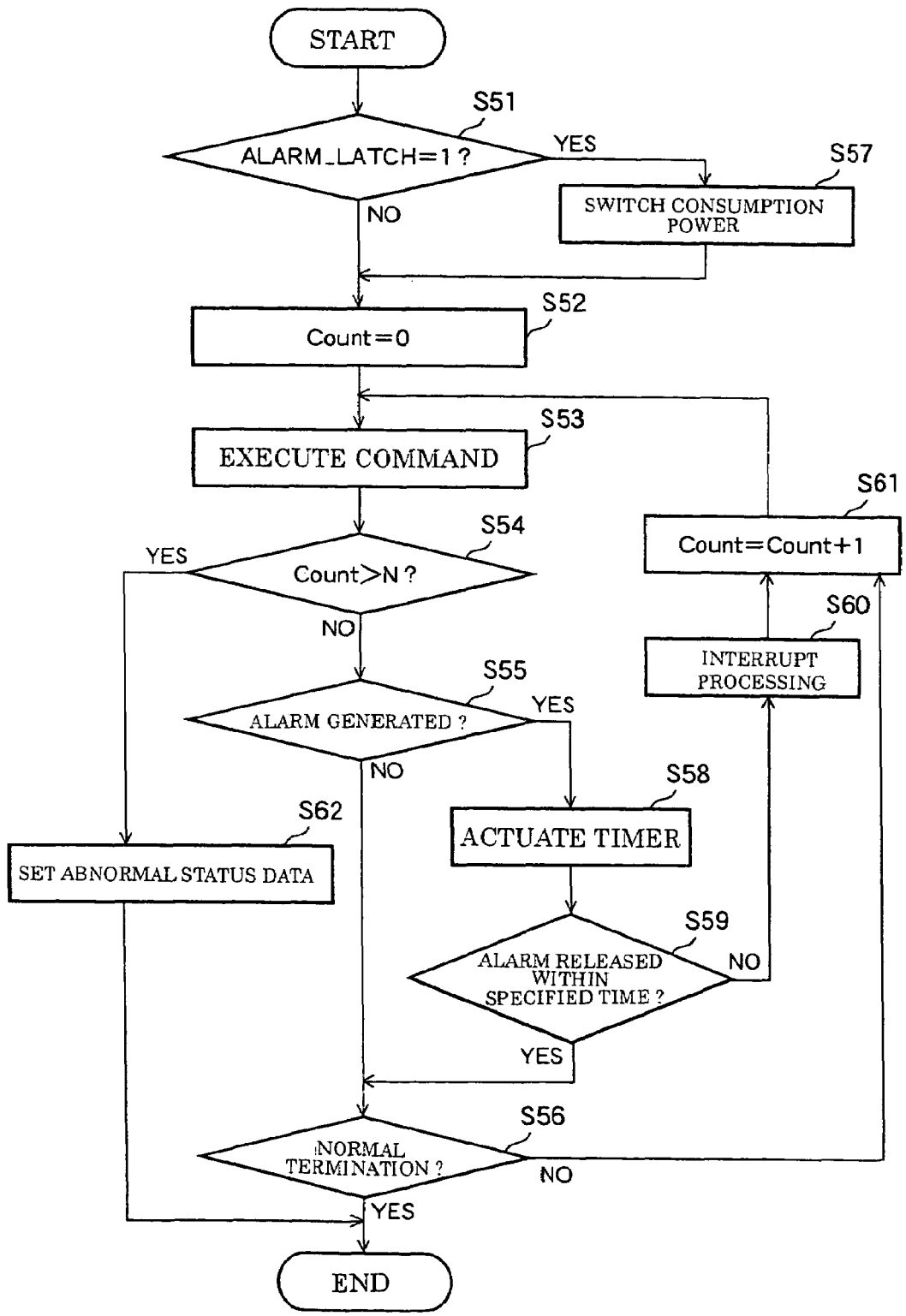
FIG. 13 is a flow chart showing another example of the command execution processing.

Hereinbelow, reference will be made to the processing in which an ALARM is generated in the processing of step S44 during the command execution in FIG. 10, while referring to a flow chart of FIG. 13. Note that in FIG. 13, the same symbols as those in FIG. 11 designate the same or corresponding parts shown in FIG. 11, and an explanation thereof is omitted here. In addition, this embodiment operates in the same manner as in the third embodiment other than the control flow of FIG. 13.

When an ALARM is generated in the processing of step S55 (S55, Yes), the MPU 13 activates a timer (S58), and determines whether the ALARM has been released before the timer reaches a preset specified time (S59). When the ALARM has been released within the specified time (S59, Yes), the control processing shifts to step S56, whereas when an ALARM has not been released (S59, No), the MPU 13 turns off the current to the magnetic field application part 36, also turns off the servo such as the focus and track actuator 38 and the like, decreases the amount of light emitted by the laser diode 31 a to an amount of light corresponding to the read power, interrupts the command execution processing (S60), adds 1 to the counter (S61), and returns to the processing of step S53.

In this embodiment, by monitoring whether the ALARM has been released before the timer reaches the preset specified time, the MPU 13 switches the power consumption when the ALARM has not been released even if the preset specified time is exceeded. In addition, the MPU 13 controls the information recording and reproducing part 1 so as to make it operate with an amount of power consumption thus switched.

Embodiment 5

Figure 14:
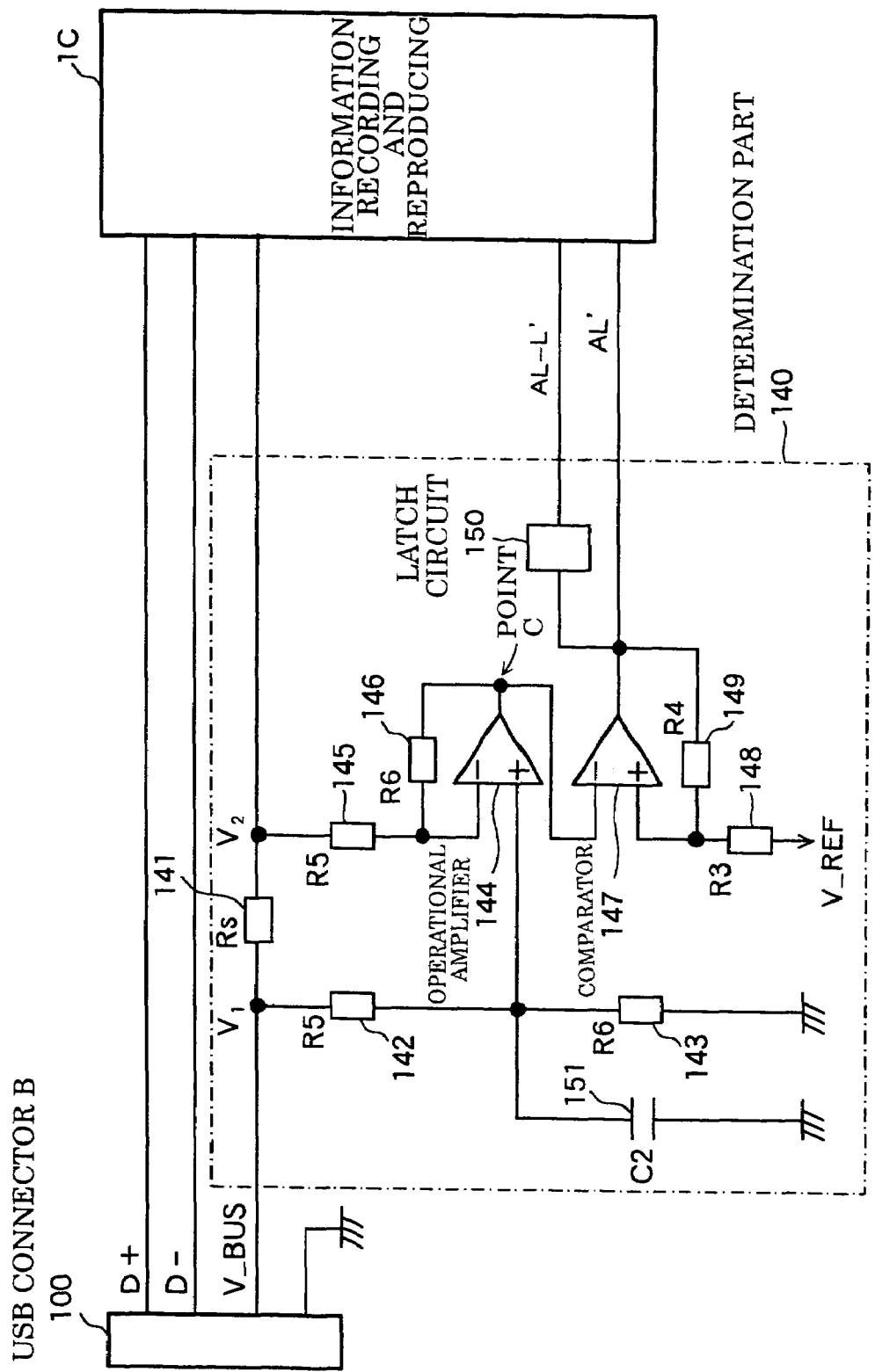
FIG. 14 is a block diagram showing one example of the construction of an information recording and reproducing device according to a fourth embodiment of the present invention.

In the above-mentioned third and fourth embodiments, the MPU 13 monitors the voltage of the power supply, but in this embodiment, the MPU 13 monitors the current of the power supply and switches the power consumption and the operation mode in accordance with the results thus obtained. FIG. 14 is a block diagram that illustrates one example of the construction of an information recording and reproducing device according to a fifth embodiment of the present invention. As shown in FIG. 14, this information recording and reproducing device comprises a USB connector B 100, a determination part 140 and an information recording and reproducing part 1C. The determination part 140 includes a sense resistor 141 with a resistance value of RS, a resistor 142 with a resistance value of R5, a resistor 142 with a resistance value of R6, a capacitor 151 with a capacitance value of C2, an operational amplifier 144, a resistor 145 with a resistance value of R5, a resistor 146 with a resistance value of R6, a comparator 147, a resistor 148 with a resistance value of R3, a resistor 149 with a resistance value of R4, and a latch circuit 150. The information recording and reproducing part 1C has the same construction as that of the information recording and reproducing part 1, but is different therefrom in an input to the MPU 13. Note that in FIG. 14, the same symbols as those in FIG. 1 designate the same or corresponding parts shown in FIG. 1, and an explanation thereof is omitted here.

In this embodiment, the sense resistor 141 is inserted in series in a V_BUS line in the determination part 140. Thus, a voltage V1 and a voltage V2 are input to the determination part 140, and the voltage V2, being lowered by the sense resistor 141, is supplied to the information recording and reproducing part 1.

First of all, in the determination part 140, a reference voltage V_REF is generated from the V_BUS, as in the second embodiment. A portion between the reference voltage V_REF thus generated and an output of the comparator 147 is voltage divided by the resistor 148 and the resistor 149, and a resultant voltage VB at point B thus obtained is input to a non-inverting terminal of the comparator 147.

On the other hand, a voltage VC at point C, which is a potential difference (V1-V2) across the opposite ends of the sense resistor 141 amplified by the operational amplifier 144, is input to an inverting terminal of the comparator 147. The voltage VC at point C can be represented as follows:

VC=(R6/R5)·(V1-V2). The capacitor 151 serves to remove a high-frequency component in a current variation so as to prevent an overdetection of the comparator 147. The comparator 147 makes a comparison between VC and VB, and outputs 0, if VC>VB, and 1, if VC<VB, to the information recording and reproducing part 1C and the latch circuit 150 as an ALARM' (AL'). According to the determination part 140 as described above, VB becomes low if ALARM'=0, and VB becomes high if ALARM'=1. As a result, the ALARM' in the form of the output of the comparator 147 has hysteresis with respect to the VC in the form of the input thereof.

The latch circuit 150 holds the ALARM' generated during the time when the MPU 13 does not accept any interrupt, and outputs the ALARM' thus held to the MPU 13 as an ALARM_LATCH' (AL-L') as necessary. The ALARM' and ALARM_LATCH' are input to an interrupt port of the MPU 13, and are inverted there into an ALARM and an ALARM_LATCH, respectively.

When the current flowing through the sense resistor 141 is smaller than a current that can be supplied in the determination part 140, the potential difference across the opposite ends of the sense resistor 141 becomes small, thus resulting in VC<VB and ALARM=0. At this time, the MPU 13 controls the power consumption in the normal state. However, when the information recording and reproducing device draws in a large current, the potential difference across the opposite ends of the sense resistor 141 becomes large, so when VC becomes larger than VB (VC>VB), ALARM becomes equal to 1 (ALARM=1). At this time, the MPU 13 switches the power consumption and the operation mode in accordance with the operating state. Here, note that in this embodiment, the switching of the power consumption and the operation mode during the load sequence, the command standby or waiting time, and the command execution time is similar to that in the third embodiment.

In this embodiment, the MPU 13 monitors the power supply voltage during operation, and switches the power consumption and the operation mode in accordance with the result of monitoring. In addition, the MPU 13 controls the information recording and reproducing part 1 so as to make it operate with an amount of power consumption and in the operation mode thus switched.

As described above, in the first through fifth embodiments, reference has been made to the examples of the information recording and reproducing device that receives the supply of power from a USB interface, but the present invention can be applied to the case where power is supplied, for example, from a battery such as a dry battery or cell, etc.

Also, it is to be noted that the constructions and operations of the information recording and reproducing devices described in the above-mentioned first through fifth embodiments are examples for achieving the present invention, but it is needless to say that their constructions are not particularly limited in any manner but can be applied in an appropriate manner within the scope of the present invention not departing from the spirit thereof. For example, the invention can be applied to devices which are used only for the purpose of reproduction or recording.

INDUSTRIAL APPLICABILITY

As described in the foregoing, according to the present invention, the following advantageous effect can be obtained. That is, the power supply voltage or the power supply current, which can be varied in accordance with the use environment of the information storage device, is monitored so that the power consumption of the device can be suppressed or the function thereof can be limited in accordance with the value of the power supply voltage or the power supply current, whereby the device can continue stable operation, thus making it possible to eliminate trouble such as a crash of the information storage device during operation.

The invention claimed is:

1. An information storage device adapted to use a power supply supplied from an interface or a battery, said device comprising:
   an electrical parameter monitoring part that performs a power supply check to increase power consumption in a stepwise manner as well as check a power supply voltage corresponding to the power consumption in each step in which the power consumption is increased stepwise;
   a determination part that determines, based on the result of the power supply check performed by the electrical parameter monitoring part, whether control is to be performed by limiting the operation to an operational range that a power supply capacity permits or by inhibiting the operation of one or more functions of all the functions of the device in each step in which the power consumption is increased stepwise; and
   a control part that operates the device based on the determination of the determination part.

2. The information storage device as set forth in claim 1, further comprising:
   an operation mode setting part that sets a plurality of operation modes corresponding to the magnitude of said electrical parameter in a selectable manner;
   wherein said control part selects one operation mode from the plurality of operation modes set by said operation mode setting part based on the monitoring result of said electrical parameter monitoring part.

3. The information storage device as set forth in claim 1, characterized in that said operation mode includes at least one of a read-only operation mode, a normal operation mode, and a bias first application inhibition operation mode.

4. The information storage device as set forth in claim 1, characterized in that said electrical parameter is a voltage value or a current value.

5. An information storage device as set forth in claim 1, wherein said electrical parameter monitoring part monitors an electrical parameter in respect of the power input from said power supply during operation in which power is being supplied; and
   said control part limits the operation or function of said device to an operational or functional range which said power supply is able to permit, by reducing the power consumption of said device based on the result of monitoring said electrical parameter by said electrical parameter monitoring part.

6. The information storage device as set forth in claim 5, characterized in that said control part limits the number of revolutions per minute of a spindle motor.

7. The information storage device as set forth in claim 5, characterized in that said control part limits an access time.

8. The information storage device as set forth in claim 5, characterized in that said control part limits the frequency of a system clock.

9. The information storage device as set forth in claim 5, characterized in that in the case of an actuator being driven by using pulse width modulation (PWM) said control part limits the duty ratio of said PWM.

10. The information storage device as set forth in claim 5, characterized in that the monitoring result of said electrical parameter monitoring part is the result of monitoring a change in the magnitude of said electrical parameter over a predetermined period of time.

11. The information storage device as set forth in claim 10, characterized in that said electrical parameter monitoring part performs monitoring by providing hysteresis to said electrical parameter.

12. The information storage device as set forth in claim 5, characterized in that when said electrical parameter falls below a predetermined value, said electrical parameter monitoring part generates an alarm, which is held until an interrupt becomes possible.

13. The information storage device as set forth in claim 12, characterized in that when said alarm is generated in a load sequence, said control part limits the function of said device thereafter only to reading information.

14. The information storage device as set forth in claim 12, characterized in that said control part limits the power consumption of said device when said alarm is generated during a command standby or command execution time.

15. The information storage device as set forth in claim 12, characterized in that said control part limits the power consumption of said device in case where said alarm is generated during a command standby or command execution time, and is not released even if a predetermined period of time has elapsed.

* * * * *

UNITED STATES PATENT AND TRADEMARK OFFICE
CERTIFICATE OF CORRECTION

| | | |
|---|---|---|
| PATENT NO. | : 7,373,529 B2 | Page 1 of 1 |
| APPLICATION NO. | : 11/007460 | |
| DATED | : May 13, 2008 | |
| INVENTOR(S) | : Nishida et al. | |

It is certified that error appears in the above-identified patent and that said Letters Patent is hereby corrected as shown below:

Title page, item [30]

Under "Prior Publication Data," delete "(30 Jun. 28, 2002 (WO) PCT/JP02/06573" and insert --(63) Continuation of Application No. PCT/JP02/06573, filed Jun. 28, 2002--.

Col. 1, line 1, after the title, insert the following:

--This is a continuation of International PCT Application No. PCT/JP02/06573 filed June 28, 2002.--.

Signed and Sealed this

Twenty-third Day of December, 2008

JON W. DUDAS
*Director of the United States Patent and Trademark Office*